United States Patent [19]

Okita et al.

[11] Patent Number: 4,496,507
[45] Date of Patent: Jan. 29, 1985

[54] PRODUCTION OF STRING-LIKE POLYTETRAFLUOROETHYLENE

[75] Inventors: Koichi Okita; Shigeru Asako, both of Osaka, Japan

[73] Assignee: Sumitomo Electric Industries, Ltd, Osaka, Japan

[21] Appl. No.: 394,958

[22] Filed: Jul. 2, 1982

[30] Foreign Application Priority Data

Jul. 4, 1981 [JP] Japan ................... 56-104758

[51] Int. Cl.³ .................... B29F 5/02
[52] U.S. Cl. ................... 264/127; 28/245; 264/288.8; 264/290.5
[58] Field of Search ........... 264/127, 288.8, 290.5, 264/290.7; 28/245, 246

[56] References Cited

U.S. PATENT DOCUMENTS 3,953,566 4/1976 Gore .................... 264/127
4,248,924 2/1981 Okita ................... 264/288.8

FOREIGN PATENT DOCUMENTS 1410366 10/1968 Fed. Rep. of Germany ........ 28/245

Primary Examiner—James Lowe
Attorney, Agent, or Firm—Sughrue, Mion, Zinn, Macpeak and Seas

[57] ABSTRACT

A process for producing a tube or rod of a polytetrafluoroethylene is described. The process comprises molding a polytetrafluoroethylene containing a liquid lubricant into a tube or rod by a paste process, removing the liquid lubricant, stretching the tube or rod in the lengthwise direction, and thereafter, by sintering the stretched tube or rod at a temperature of at least 327° C. wherein the stretching of the tube or rod is carried out by the use of at least one pair of heating rolls which are each provided with a plurality of grooves. The process provided uniform stretching making it possible to produce a tube or rod with very small internal diameter.

3 Claims, 2 Drawing Figures

PRODUCTION OF STRING-LIKE POLYTETRAFLUOROETHYLENE

BACKGROUND OF THE INVENTION

The present invention relates to a process for the production of string-like porous materials, and more particularly, to a process for producing string-like porous materials of polytetrafluoroethylene, having fine pore diameters and high porosities.

The term "string-like material" is used herein to refer to a solid or hollow cylindrical material, e.g., a tube and a rod.

Japanese Patent Publication No. 13560/67 and U.S. Pat. No. 3,953,566 disclose methods of producing string-like porous materials of polytetrafluoroethylene. It has been found, however, that these methods suffer from disadvantages in that they can provide only string-like materials having large pore diameters. In accordance with these processes if the pore diameter is decreased to 0.5 micron or less, the porosity of the string-like material will be seriously reduced.

A method of stretching polytetrafluoroethylene string-like materials is described in U.S. Pat. No. 3,664,915. In accordance with this method, a heating furnace is placed intermediate between two pairs of pinch rolls which are not heated. By running the two pairs of pinch rolls at different rates of rotation, the string-like material is stretched while it is passed through the heating furnace. It has been found, however, that when the method is used to stretch string-like materials, a considerably large temperature difference will occur between the surface of the string-like material and the inside, making it difficult to achieve uniform stretching.

It is believed that in order to achieve uniform stretching, it is desirable to heat the string-like material in such a manner that the temperature of the inside thereof is equal to that of the surface before the stretching force is exerted on the string-like material, and to apply a given compression force all around the string-like material after the stretching force is exerted.

The method disclosed in U.S. Pat. No. 3,664,915, however, does not meet either of the above two requirements.

SUMMARY OF THE INVENTION

An object of the present invention is to obviate the above-described defects of the conventional arts and provide a process for the production of string-like porous materials which permits a uniform stretching.

As a result of investigations to develop a process of stretching string-like materials meeting the above-described requirements, it has been found that the object can be attained by stretching the string-like material by the use of heating rolls which are each engraved with grooves of the size that is nearly equal to the outer diameter of the string-like material.

The present invention, therefore, provides a process for producing a string-like porous material of polytetrafluoroethylene which comprises molding polytetrafluoroethylene containing a liquid lubricant into a string-like material by a paste process, removing the liquid lubricant, stretching the string-like material in the lengthwise direction, and thereafter, by sintering the stretched string-like material at a temperature of at least 327° C., wherein the stretching of the string-like material in the lengthwise direction is performed by the use of at least one pair of heating rolls which are each provided with a plurality of grooves.

DETAILED DESCRIPTION OF THE INVENTION

The invention will hereinafter be explained in detail with reference to the accompanying drawings.

Figure 1:
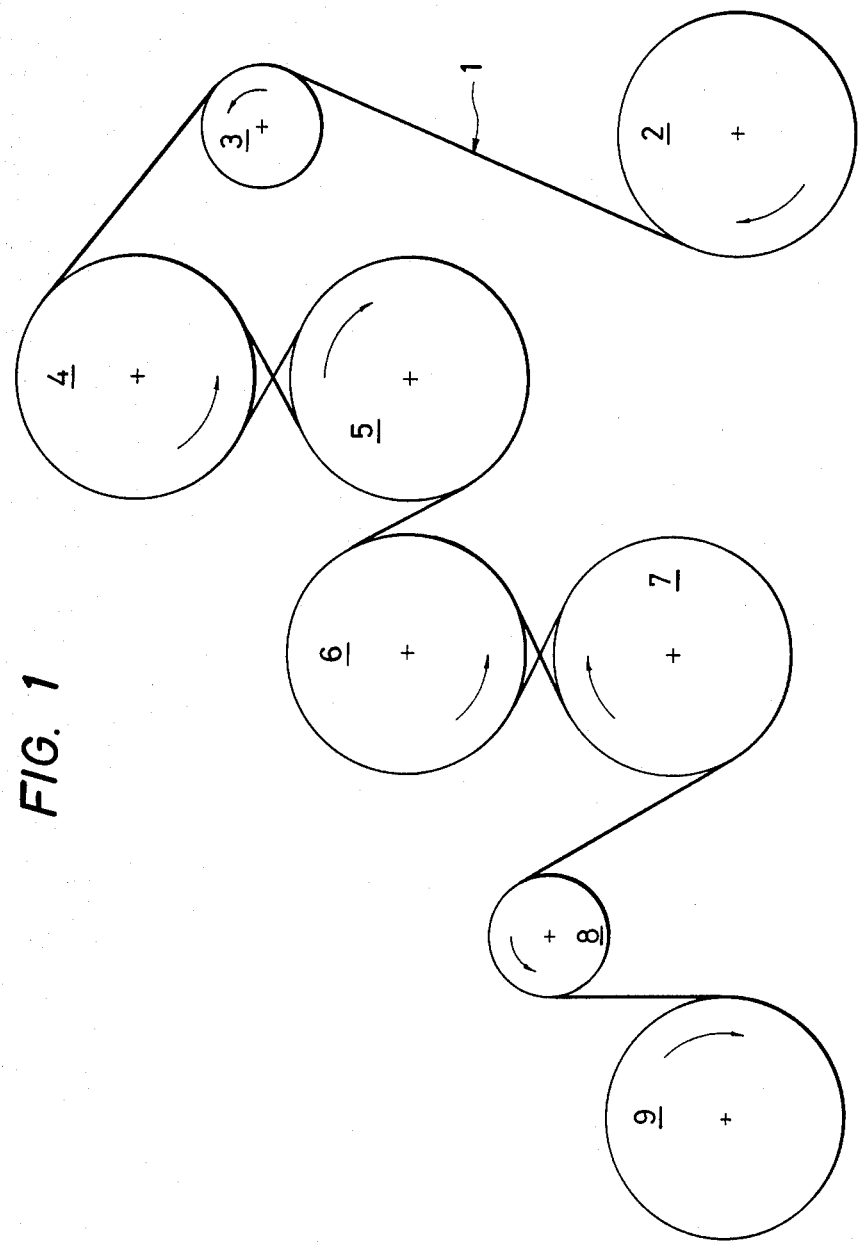
FIG. 1 illustrates an arrangement of heating rolls which is suitable to practice the process of the invention.

Referring to FIG. 1, a polytetrafluoroethylene string-like material 1 is supplied from a supply bobbin 2 and reaches a stretching roll 4 through a guide roll 3. Stretching rolls 4, 5, 6 and 7 are each provided with a plurality of grooves and are heated. The string-like material 1 is arranged to travel on the stretching rolls 4 and 5 in such a manner that part of the outer surface of the string-like material 1, which comes into contact with the stretching roll 4 when the string-like material 1 travels thereon, does not contact with the stretching roll 5 when the string-like material 1 is passed to and travels on the stretching roll 5. Furthermore, when the string-like material 1 is returned to and travels on the stretching roll 4, it again comes into contact with the stretching roll 4. Thus, when the string-like material 1 shuttles between the stretching roll 4 and the stretching roll 5 several times in that manner, the entire outer surface of the string-like material 1 comes into even contact with the stretching roll and is uniformly heated to a predetermined temperature.

The stretching rolls 4 and 5 are rotated at the same speed. Furthermore, the stretching rolls 6 and 7 are rotated at the same speed. However, the stretching rolls 5 and 6 are rotated at different speeds. Thus, when the string-like material 1 passes from the stretching roll 5 to the stretching roll 6, it is abruptly stretched.

The thus-stretched string-like material 1 moves from the stretching roll 6 to the stretching roll 7 and then from the stretching roll 7 to the stretching roll 6, repeatedly, so that the entire whole surface of the string-like material 1 comes into contact with the stretching rolls. During this period of time, therefore, a uniform compression force is exerted on the outer surface of the string-like material to produce a uniform structure. Thereafter, the string-like material 1 is passed to a winding bobbin 9 through a cooling roll 8 and is wound on the winding bobbin 9.

Figure 2:
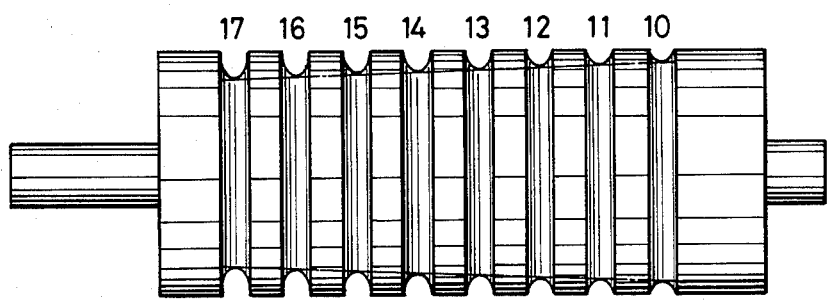
FIG. 2 is an illustrative side view of a heating roll provided with a plurality of grooves which is used in the process of the invention.

FIG. 2 shows a side view of each of the stretching rolls 4 to 7. In this embodiment, eight grooves are engraved in the stretching roll. Although all the grooves may be the same in depth, it is preferred that the depth is gradually increased from the groove 10 to the groove 17 so that the elongation of the string-like material 1 due to thermal expansion can be compensated for. Furthermore, when not only the stretching rolls 4 and 5 but also the stretching rolls 6 and 7 on which the stretched string-like material moves have grooves whose depths are different from each other at least for a part thereof, better results can be obtained.

With regard to the shape of the groove, it is preferably designed so that when the string-like material 1 moves from the stretching roll 4 to the stretching roll 5 and then, from the stretching roll 5 to the stretching roll 4, or from the stretching roll 6 to the stretching roll 7 and then, from the stretching roll 7 to the stretching roll 6, the outer surface of the string-like material 1 coming into contact with the groove 10 is slightly twisted when it comes into contact with the groove 11, and while moving from the groove 10 to the groove 17, the string-like material 1 is rotated. In order to twist the string-like material in this manner the groove is preferably designed so that its shape is not the same as the periphery of the material 1 but slightly changed into an oval form. In order to change the distance between the rolls, it is possible to adjust the position of one or more of the stretching rolls.

The temperature of the stretching roll provided with a plurality of grooves will hereinafter be explained.

The stress required for stretching the polytetrafluoroethylene is closely related to the temperature and tends to decrease as the temperature is raised. Therefore, the higher the temperature, the easier it is to perform stretching without causing any break. Therefore, the temperatures of the low speed rotation stretching rolls 4 and 5 are preferably 250° C. or more. However, if the temperature of the high speed rotation stretching rolls 6 and 7, which come into contact with the stretched string-like material, are too high, when the stretched string-like material moves from the roll 6 to the roll 7, surface layer-peeling sometimes occurs. This is because the stretched polytetrafluoroethylene string-like material becomes increasing sticking at higher temperature.

As a result of various investigations, it has been found that a uniform compression force can be applied onto the stretched string-like material when the temperature of the high speed rotation stretching roll is controlled to be about 50° C. or more, less than that of the low speed rotation stretching roll while not exceeding the maximum temperature of 260° C.

Contrary to the conventional concept that it is preferred in stretching to employ a group of rolls which are maintained as equal as possible in temperature, it has been found according to the invention that better results can be obtained by performing stretching by the use of stretching rolls having a temperature differential of at least about 50° C.

The following examples are given to illustrate the invention in greater detail although the invention is not limited thereto.

EXAMPLE 1

To 100 parts of polytetrafluoroethylene fine powder (Polyflon F104, produced by Daikin Kogyo Co., Ltd.) was added 20 parts of a petroleum solvent (DOSB, produced by Shell Chemical Co., Ltd.), and they were uniformly mixed. The mixture was then introduced into a cylinder with an inner diameter of 90 mm through which a mandrel with a diameter of 10 mm was fitted in the center thereof, and compressed to prepare a tube-like preliminarily molded article.

The molded article was placed in an extruder equipped with a die part having an inner diameter of 4.5 mm and a core pin of diameter of 1.5 mm. After the cylinder and the die part were heated up to 60° C., the ram was caused to fall at a rate of 10 mm/min to extrude a tube with an outer diameter of 4.7 mm and an inner diameter of 1.5 mm. The tube was then soaked in trichloroethylene to remove the petroleum solvent and dried. The tube thus prepared was a porous material having an apparent specific gravity of 1.6 and a porosity of about 30%.

The tube was placed in an 8-shaped configuration on stretching equipment as shown in FIG. 1 comprising rolls provided with a plurality of grooves as illustrated in FIG. 2. The rolls have an outer diameter of 200 mm and a drum length of 300 mm and their surfaces have been processed by hard chromium plating. Each roll is provided with 10 grooves having a rounded bottom of a curvature of 2.5 mm and being arranged at a distance of 10 mm. The depths of the grooves are varied gradually such that the difference in depth between the groove at one end and that at the other end of the roll is 5 mm so as to be able to compensate for thermal elongation of the tube. The distance between the rolls 4 and 5, and that between the rolls 6 and 7 are each 10 mm. The rolls 5 and 6 are arranged at a distance of 20 mm. The tube was stretched under the conditions shown in Table 1, and sintered in a heating oven maintained at an atmosphere of at least 327° C. The thus-prepared tube was confirmed to have a high porosity and uniform and fine pore diameters.

TABLE 1

| | Stretching Conditions and Physical Properties of Tubes | | | | | | |
|---|---|---|---|---|---|---|---|
| | Roll Temperature | | Roll Speed | | Physical Properties of Tube | | |
| | Low-Speed | High-Speed | Low-Speed | High-Speed | | | |
| Run No. | Rotation Roll (°C.) | Rotation Roll (°C.) | Rotation Roll (m/min) | Rotation Roll (m/min) | Porosity (%) | Bubble Point (kg/cm²) | Remarks |
| 1 | 200 | 200 | 2.0 | 8.0 | 77 | 0.20 | Breakage easily occurred. |
| 2 | 300 | 120 | 2.0 | 16.0 | 75 | 0.40 | |
| 3 | 300 | 175 | 2.0 | 16.0 | 73 | 0.65 | |
| 4 | 300 | 230 | 2.0 | 16.0 | 74 | 0.63 | |
| 5 | 300 | 300 | 2.0 | 16.0 | 74 | 0.62 | Unevenness occurred in stretching. |
| 6 | 300 | 175 | 5.0 | 40.0 | 66 | 0.77 | |
| 7 | 100 | 100 | 1.0 | 5.0 | 80 | — | Cracks occurred. |
| 8 | 150 | 120 | 2.0 | 8.0 | 76 | 0 | Cracks occurred. |

With regard to the temperature conditions for stretching, when the temperature of the low speed rotation roll was lower as in Run No. 1, the stress encountered in stretching was large. As the stretching ratio was increased, cracking of the tube, uneven stretching, and breakage occurred. Thus it has been found that it is desirable to control the temperature within the range of from 250° C. to not more than the melting point of the polytetrafluoroethylene.

When the temperature of the high speed rotation roll was low, the compression effect after stretching was insufficiently obtained, and those having higher bubble points could not be prepared. However, when the temperature was too high, sticking properties with respect to the surface of the roll increased, making it difficult to perform uniform stretching. It was only within the temperature range of 260° C. or less that a tube having a uniform appearance could be obtained.

Furthermore, it has been found that as the roll speed is increased, the compression effect can be enhanced and, therefore, a tube having a high bubble point can be obtained.

EXAMPLE 2

To 100 parts of polytetrafluoroethylene fine powder was added 18 parts of the same petroleum solvent as used in Example 1, DOSB, and they were uniformly mixed. The mixture was then introduced into a cylinder with an inner diameter of 130 mm and compressed to achieve preliminary molding.

The molded article thus produced was placed in an extruder equipped with a die having an inner diameter of 45 mm. After the cylinder and the die part were heated up to 60° C., extrusion was carried out to prepare a rod having an outer diameter of 4.7 mm. The rod was soaked in trichloroethylene to remove the petroleum solvent and, thereafter, dried.

The rod thus prepared was placed on the same stretching equipment as in Example 1 in an 8-shaped configuration and stretched under the conditions shown in Table 2. Thereafter, it was sintered in a heating oven having an atmosphere of at least 327° C.

As in Run No. 3, 4 and 6 the tubes stretched at a suitable temperature had a uniform appearance, high porosity and high bubble point. On the other hand, according to conventional technique, stretching tubes having a porosity of 60% or more could not be obtained from polytetrafluoroethylene tube having a fine pore diameter (e.g. bubble point: 0.6 kg/cm² or more). In contrast, in this invention stretched tubes having a porosity by more than 10% higher than that of the conventional article were obtained from the material having the same bubble point. This difference is believed due to the fact that sufficient contact between the tube and the surface of rolls assures uniform heat transfer to the tube to permit uniform stretching and that after stretching compression force is exerted between the groove and the tube thereby giving a finer pore diameter of the tube. Stronger compression force is obtained at a higher roll speed. For example, in Run No. 6 a tube was obtained which has a bubble point higher than that of the product in Run No. 3.

The physical properties of the rods thus-produced are shown in Table 2 below.

obtained with a higher stretching ratio or a higher roll speed.

By stretching the resin is orientated and become fibrous to have a high strength. This needs sufficient heating of the resin to be stretched. According to the present invention, a sufficient amount of heat can be supplied through the surface of rolls and therefore the present invention is excellent particularly in high speed stretching; according to the present invention uniform stretching can be performed at a high speed and at a high stretching ratio and rods having a high strength can be obtained.

While the invention has been described in detail and with reference to specific embodiments thereof, it will be apparent to one skilled in the art that various changes and modifications can be made therein without departing from the spirit and scope thereof.

What is claimed is:

1. A process for producing a string-like porous material of a polytetrafluoroethylene, comprising the steps of:

molding polytetrafluoroethylene into a string-like shape, the polytetrafluoroethylene containing a liquid lubricant, the molding being performed by a paste process:

removing the liquid lubricant;

providing a low speed set of heating rolls and a high speed set of heating rolls, wherein the heating rolls are each provided with a plurality of grooves, and the temperature of the low speed heating rolls is higher than the temperature of the high speed heating rolls;

placing the molded polytetrafluoroethylene on the low speed pair of heating rolls by threading it in a FIG. 8 configuration around the low speed rolls and within the grooves thereof;

placing the molded polytetrafluoroethylene on the high speed pair of heating rolls by threading it in a FIG. 8 configuration around the high speed rolls and within the grooves thereof;

rotating each of the high speed pair of rolls at the same speed and each of the low speed pair of rolls at the same speed, the high speed pair of rolls being rotated faster than the low speed pair of rolls to create a uniform compression force during the stretching, the force being applied in the peripheral direction of the string-like material;

sintering the stretched string-like material at a temperature of 327° C. or more.

2. A process for producing a string-like porous material of a polytetrafluoroethylene, as claimed in claim 1,

TABLE 2

| | Stretching Conditions and Physical Properties of Rods | | | | | | |
|---|---|---|---|---|---|---|---|
| | Roll Temperature | | Roll Speed | | | | |
| | Low-Speed | High-Speed | Low-Speed | High-Speed | Physical Properties of Rod | | |
| Run No. | Rotation Roll (°C.) | Rotation Roll (°C.) | Rotation Roll (m/min) | Rotation Roll (m/min) | Stretching Ratio (%) | Porosity (%) | Tensile Strength (kg/cm²) |
| 9 | 300 | 230 | 1.0 | 5.0 | 400 | 77.7 | 2.56 |
| 10 | 300 | 230 | 10.0 | 50.0 | 400 | 76.2 | 2.50 |
| 11 | 300 | 230 | 1.0 | 8.0 | 700 | 79.3 | 3.05 |
| 12 | 300 | 230 | 10.0 | 80.0 | 700 | 75.2 | 3.35 |
| 13 | 300 | 230 | 1.0 | 11.0 | 1,000 | 79.5 | 4.86 |
| 14 | 300 | 230 | 10.0 | 110.0 | 1,000 | 71.6 | 6.85 |

The rod thus-produced was confirmed to have a uniform appearance, a high porosity and a high tensile strength. Rods having a higher tensile strength were wherein the low speed heating rolls are maintained at a temperature at least 50° C. higher than the high speed pair of heating rolls.

3. A process for producing a string-like porous material of a polytetrafluoroethylene, as claimed in claim 1, wherein the temperature of the low speed pair of heating rolls are maintained at a temperature of from 250° C. up to the melting point of the polytetrafluoroethylene, and the temperature of the high speed pair of heating rolls are maintained at a temperature at least 70° C. lower than the temperature of the low speed roll.

* * * * *